United States Patent
Kasahara et al.

(10) Patent No.: US 9,674,459 B2
(45) Date of Patent: Jun. 6, 2017

(54) IMAGE PROCESSING SYSTEM

(71) Applicants: Ryosuke Kasahara, Kanagawa (JP); Koichiro Nakamura, Kanagawa (JP)

(72) Inventors: Ryosuke Kasahara, Kanagawa (JP); Koichiro Nakamura, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/891,229

(22) PCT Filed: May 8, 2014

(86) PCT No.: PCT/JP2014/062899
§ 371 (c)(1),
(2) Date: Nov. 13, 2015

(87) PCT Pub. No.: WO2014/185479
PCT Pub. Date: Nov. 20, 2014

(65) Prior Publication Data
US 2016/0094771 A1    Mar. 31, 2016

(30) Foreign Application Priority Data

May 15, 2013  (JP) .................. 2013-103354
May 15, 2013  (JP) .................. 2013-103362
(Continued)

(51) Int. Cl.
*H04N 5/222* (2006.01)
*H04N 5/235* (2006.01)
(Continued)

(52) U.S. Cl.
CPC .......... *H04N 5/2355* (2013.01); *G03B 15/00* (2013.01); *G06K 9/00798* (2013.01);
(Continued)

(58) Field of Classification Search
CPC .... B60R 2300/105; B60R 1/00; H04N 7/181; G03F 7/70566; G03F 7/70575
(Continued)

(56) References Cited

U.S. PATENT DOCUMENTS 8,654,179 B2    2/2014  Kanamori et al.
9,317,754 B2*   4/2016  Hirai .................. G06K 9/00798
(Continued)

FOREIGN PATENT DOCUMENTS

JP    2002-286862    10/2002
JP    2009-246770 A  10/2009
(Continued)

OTHER PUBLICATIONS

Office Action issued Jun. 21, 2016 in Korean Patent Application No. 10-2015-7032677 (with English language translation).
(Continued)

*Primary Examiner* — Kelly L Jerabek
(74) *Attorney, Agent, or Firm* — Oblon, McClelland, Maier & Neustadt, L.L.P.

(57) ABSTRACT

An image processing system includes a brightness polarization superimposing unit. The brightness polarization superimposing unit superimposes, on a brightness image, polarization information of an image IMP that includes the polarization information, as a change in brightness of each pixel. The image processing system has a function of outputting an image obtained by superimposition by the brightness polarization superimposing unit as an output image IMO.

19 Claims, 4 Drawing Sheets

(30) Foreign Application Priority Data

Oct. 22, 2013 (JP) .................................. 2013-219198
Jan. 24, 2014 (JP) .................................. 2014-011648

(51) Int. Cl.
| | | |
|---|---|---|
| G03B 15/00 | (2006.01) | |
| H04N 5/225 | (2006.01) | |
| G06T 5/00 | (2006.01) | |
| G06K 9/00 | (2006.01) | |
| G06K 9/20 | (2006.01) | |
| G06T 5/50 | (2006.01) | |
| G03B 7/00 | (2014.01) | |

(52) U.S. Cl.
CPC .............. *G06K 9/209* (2013.01); *G06T 5/008* (2013.01); *G06T 5/50* (2013.01); *H04N 5/225* (2013.01); *H04N 5/2351* (2013.01); *G06T 2207/20221* (2013.01); *G06T 2207/30252* (2013.01); *G06T 2207/30256* (2013.01)

(58) Field of Classification Search
USPC ................ 348/148, 222.1, 362, 365
See application file for complete search history.

(56) References Cited

U.S. PATENT DOCUMENTS

| | | | |
|---|---|---|---|
| 2009/0135277 A1 | 5/2009 | Kasahara | |
| 2009/0190008 A1 | 7/2009 | Kasahara | |
| 2009/0190855 A1 | 7/2009 | Kasahara | |
| 2009/0201417 A1 | 8/2009 | Kasahara | |
| 2009/0202171 A1 | 8/2009 | Kasahara | |
| 2009/0226086 A1 | 9/2009 | Kasahara | |
| 2009/0231416 A1 | 9/2009 | Kasahara | |
| 2009/0231472 A1 | 9/2009 | Kasahara | |
| 2009/0238455 A1 | 9/2009 | Kasahara | |
| 2009/0244537 A1* | 10/2009 | Murooka | A61B 1/00009 356/364 |
| 2009/0279807 A1* | 11/2009 | Kanamori | G02B 5/3025 382/274 |
| 2009/0290039 A1* | 11/2009 | Kanamori | H04N 9/045 348/222.1 |
| 2010/0002105 A1 | 1/2010 | Kasahara | |
| 2010/0013965 A1 | 1/2010 | Pugh, Jr. et al. | |
| 2010/0079622 A1 | 4/2010 | Kasahara et al. | |
| 2011/0043623 A1* | 2/2011 | Fukuta | G02B 27/0018 348/135 |
| 2011/0050714 A1 | 3/2011 | Sekiguchi et al. | |
| 2011/0128408 A1 | 6/2011 | Ishigaki et al. | |
| 2011/0254947 A1 | 10/2011 | Kasahara | |
| 2011/0261152 A1 | 10/2011 | Kasahara | |
| 2011/0285898 A1* | 11/2011 | Kasahara | G02B 5/1885 348/360 |
| 2011/0292240 A1 | 12/2011 | Sekiguchi et al. | |
| 2012/0069181 A1 | 3/2012 | Xue et al. | |
| 2012/0237123 A1 | 9/2012 | Kasahara | |
| 2012/0268602 A1 | 10/2012 | Hirai et al. | |
| 2013/0010146 A1 | 1/2013 | Kasahara | |
| 2013/0016189 A1* | 1/2013 | Hosaka | H04N 13/0239 348/49 |
| 2013/0136306 A1* | 5/2013 | Li | G02B 27/28 382/103 |
| 2014/0092227 A1 | 4/2014 | Kanamori et al. | |
| 2014/0218486 A1* | 8/2014 | Kobayashi | H04N 13/0217 348/49 |
| 2015/0172361 A1* | 6/2015 | Vetter | H04L 67/025 715/740 |

FOREIGN PATENT DOCUMENTS

| | | |
|---|---|---|
| JP | 2009-260500 | 11/2009 |
| JP | 4435865 B2 | 3/2010 |
| JP | 4563513 | 8/2010 |
| JP | 2011-029903 | 2/2011 |
| JP | 2012-084121 | 4/2012 |
| JP | 2012-185602 | 9/2012 |
| KR | 10-2013-0040964 A | 4/2013 |
| WO | WO 2008/011050 A2 | 1/2008 |
| WO | 2009/128340 | 10/2009 |
| WO | 2013/175686 | 11/2013 |

OTHER PUBLICATIONS

International Search Report issued on Jun. 10, 2014 in PCT/JP2014/062899 filed on May 8, 2014.
Extended European Search Report issued Mar. 1, 2016 in Patent Application No. 14797051.1.
Aed El-Saba, et al., "Pattern recognition via multispectral, hyperspectral, and polarization-based imaging" Proceedings of SPIE, vol. 7696, XP040536152, 2010, pp. 76961M-1-76961M-16.
C. S. L. Chun, et al., "Automatic Target Recognition Using Polarization-Sensitive, Thermal Imaging" Proceedings of SPIE, International Society for Optical Engineering, vol. 2485, XP000889782, 1995, pp. 353-364.
Viktor Gruev, et al., "Advances in Integrated Polarization Image Sensors" IEEE/NIH, Life Sciences Systems and Applications Workshop (LiSSA 2009), XP031452044, 2009, pp. 62-65.

\* cited by examiner

IMAGE PROCESSING SYSTEM

TECHNICAL FIELD

The present invention relates to an image processing system, and specifically to an image processing system that processes an image including polarization information.

BACKGROUND ART

It has been known that polarization information is used for image processing (Japanese Laid-open Patent Publication No. 2011-29903, Japanese Patent No. 4563513, Japanese Laid-open Patent Publication No. 2012-185602, Japanese Laid-open Patent Publication No. 2002-286862 and the like).

For example, it has been known that in an image capturing device such as a camera, "a polarization filter divided into areas" is arranged on an image capturing element, and a polarization direction of light obtained by a pixel is changed to take an image.

Further, there has been known a method for outputting "a picture" by using Obtained brightness information as a brightness image and using the obtained polarization information as color information.

For example, Japanese Laid-open Patent Publication No. 2011-29903 describes a method which includes obtaining "an image including polarization information" by using the polarization filter and outputting the image by regarding a normal vector of the polarization information as the direction of an arrow.

Japanese Laid-open Patent Publication No. 2011-29903 also describes a method which includes determining a visible ray spectrum according to a polarization angle and "reconstructing each pixel by color coding" according to the polarization angle.

In the method described in Japanese Laid-open Patent Publication No. 2011-29903, the polarization information of the output image is expressed with "the arrow and the color". Thus, when the polarization information is used, it is impossible to use "a general process on the brightness image".

For example, even if one intends to use the image including the polarization information of a vehicle-mounted camera for "recognition of a white line on a road surface", it is impossible to perform a process based on "an algorithm for the white line recognition using brightness".

In other words, it is necessary to newly develop "white line recognition processing used for the polarization information expressed as color".

SUMMARY OF THE INVENTION

Technical Problem

Under the above-described circumstances, there is a need to provide a novel image processing system that makes it possible to use polarization information by using a process on a brightness image.

Solution to Problem

An image processing system according to the present invention includes: a brightness polarization superimposing unit that superimposes polarization information of an image that includes the polarization information, on a brightness image as a change in brightness of each pixel. The image processing system has a function of outputting an image obtained by superimposition by the brightness polarization superimposing unit as an output image

Advantageous Effects of Invention

According to the image processing system of an embodiment, the polarization information is superimposed on the brightness image as change in brightness of each pixel and output as an output image.

Thus, general image processing on the brightness image can be performed on the output image to be output.

DESCRIPTION OF EMBODIMENTS

Figure 1:
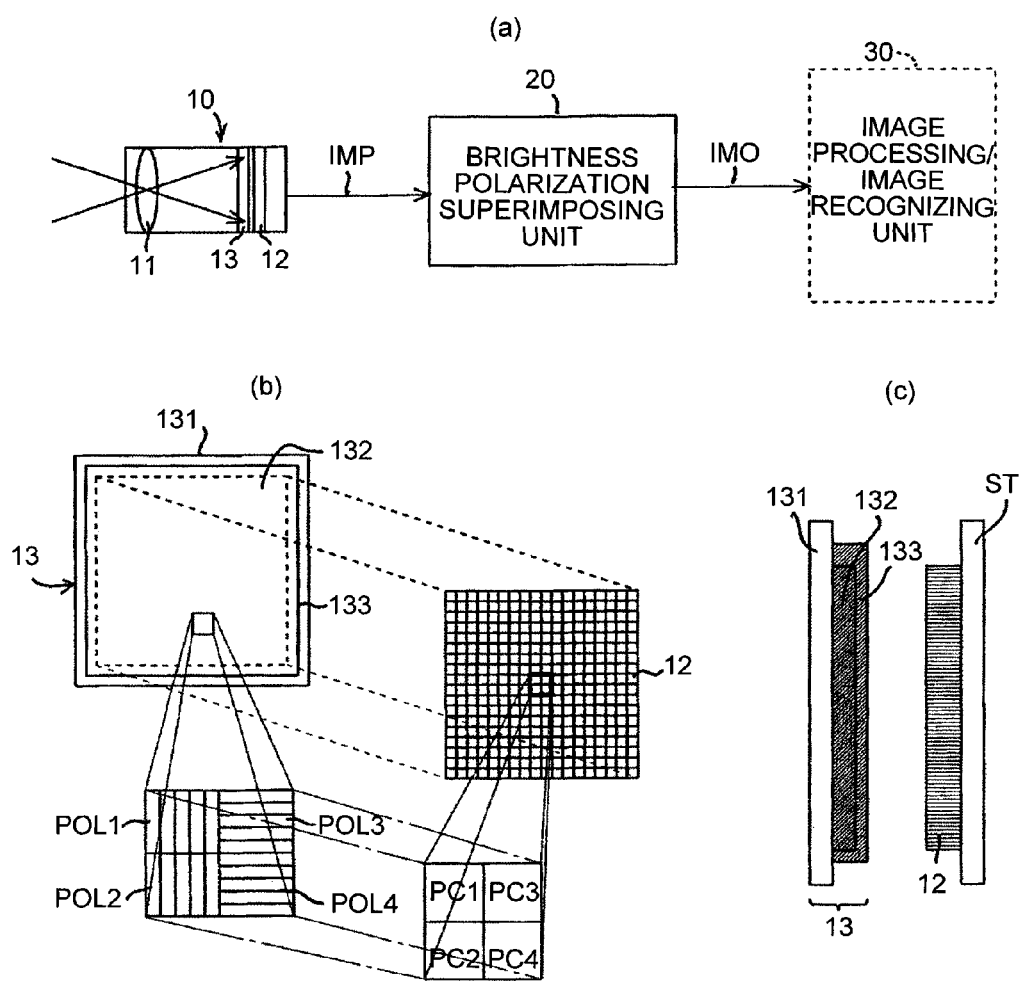
FIG. 1 is a diagram illustrating an embodiment of an image processing system.

Embodiments of the present invention will be described below.

FIG. 1(a) is a conceptual diagram illustrating an embodiment of an image processing system.

In FIG. 1(a), reference numeral 10 indicates an "image capturing unit", reference numeral 20 indicates a "brightness polarization superimposing unit", and reference numeral 30 indicates an "image processing/image recognizing unit".

Among the image capturing unit 10, the brightness polarization superimposing unit 20, and the image processing/image recognizing unit 30, the brightness polarization superimposing unit 20 is essential for the image processing system of the present invention.

In other words, the brightness polarization superimposing unit 20 alone may constitute the image processing system of the present invention.

The image capturing unit 10 may be combined with the brightness polarization superimposing unit 20 separately from the image processing system of the present invention, or may constitute a part of the image processing system.

Similarly, the image processing/image recognizing unit 30 may also be separated from the image processing system of the present invention, or may constitute a part of the image processing system.

The image capturing unit 10 captures "an image that includes the polarization information" to which superimposing processing is performed by the brightness polarization superimposing unit 20. A symbol IMP in FIG. 1(*a*) indicates "an image that includes the polarization information".

The image IMP is called a "polarization image IMP" below.

The image capturing unit 10 may use a so-called "polarization camera" provided independently of the image processing system. In this case, a polarization image IMP may be obtained as a "captured image" of the polarization camera.

An example of the configuration of the image capturing unit 10 will be described with reference to FIGS. 1(*a*), 1(*b*), and 1(*c*).

As illustrated in FIG. 1(*a*), the image capturing unit 10 includes an imaging lens 11, an image capturing element 12, and an optical filter 13.

FIG. 1(*c*) illustrates how the image capturing element 12 and the optical filter 13 are viewed laterally.

In the image capturing element 12, pixels are two-dimensionally arrayed on a substrate ST. In the described example, the pixels are arrayed according to a square matrix.

In the optical filter 13, a polarization filter 132 is sandwiched between a transparent substrate 131 and a packed layer 133.

FIG. 1(*c*) illustrates as if the optical filter 13 and the image capturing element 12 are separate from each other. Actually, however, the optical filter 13 is closely attached to the image capturing element 12.

Specifically, a proximal section between the polarization filter 132 and the image capturing element 12 is filled with the packed layer, 133 serving as an "adhesive". As a result, the optical filter 13 and the image capturing element 12 are integrated.

The polarization filter 132 is a so-called "area division polarization filter". Specifically, different types of polarization filter elements each having a different polarization direction are two-dimensionally arrayed in accordance with the pixels of the image capturing element 12.

In FIG. 1(*b*), four neighboring pixels PC1, PC2, PC3, and PC4 are overlapped with corresponding polarization filter elements POL1, POL2, POL3, and POL4, respectively.

Two types of polarization filter elements are used for the polarization filter 132. A first type of polarization filter element transmits P polarization. A second type of polarization filter element transmits S polarization.

The two types of polarization filter elements are in the shape of a rectangle. A longitudinal direction of the polarization filter element corresponds to a longitudinal direction (column direction of two-dimensional line-column array) of the pixel array of the image capturing element 12 in FIG. 1(*b*).

The polarization filter elements having the rectangular shape are alternately arrayed in a lateral direction (line direction).

As illustrated in FIG. 1(*b*), the pixels PC1 and PC2 are arrayed in the longitudinal direction. The polarization filter elements POL1 and POL2 that transmit the S polarization are arrayed in the longitudinal direction. Thus, the polarization filter elements POL1 and POL2 correspond to the pixels PC1 and PC2, respectively.

Similarly, the pixels PC3 and PC4 are arrayed in the longitudinal direction. The polarization filter elements POL3 and POL4 that transmit the P polarization are arrayed in the longitudinal direction. Thus, the polarization filter elements POL3 and POL4 correspond to the pixels PC3 and PC4, respectively.

An image of a subject captured by the image capturing unit 10 is formed on the polarization filter 132. The image passes through each polarization filter element to become P or S polarization, which is then received by the image capturing element 12.

In this manner, an image of the P polarization or the S polarization is captured by the image capturing element 12 for each pixel.

The thus captured image is "an image that includes polarization information", and is output as a polarization image IMP as illustrated in FIG. 1.

As information on the image, the polarization image IMP includes "the brightness image and the polarization information".

The polarization image IMP is input to the brightness polarization superimposing unit 20.

The brightness polarization superimposing unit 20 physically includes a CPU and a microcomputer. By program computing based on an algorithm described later, the brightness image and the polarization information are superimposed.

As has been described, as information on the image, the polarization image IMP includes "the brightness image and the polarization information", and the "brightness image" and the "polarization information" are extracted from the polarization image IMP.

The thus extracted polarization information is superimposed on the brightness image. Specifically, the polarization information of the polarization image IMP is "superimposed on the brightness image as a change in brightness of each pixel".

The brightness image and the polarization information are superimposed in this manner, and then output as an output image IMO illustrated in FIG. 1(*a*).

The image obtained by superimposing the brightness image and the polarization information is called "a brightness polarization superimposed image".

For the output image IMO, a "general brightness image process in the related art" such as "a process on LDW and AHB" is possible for mounting on a vehicle.

As described above, the brightness image process of the related art can be performed on the output image IMO. In an example of FIG. 1(*a*), the output image IMO is input to the image processing/image recognizing unit 30.

Upon receiving input of the output image IMO, the image processing/image recognizing unit 30 performs desired image processing and image recognition processing.

For example, if the image processing system illustrated in FIG. 1(*a*) is mounted "for the purpose of vehicle control", the image processing/image recognizing unit 30 performs, for example, a process of extracting a recognized object.

The vehicle control unit having received the result of the above process performs the vehicle control such as assistance of the operation of a brake and a steering wheel of the vehicle.

The output image IMO may be processed by the "brightness image process of the related art". Thus, it is not necessary to "newly develop image processing or image recognition processing for the polarization image".

By use of the image processing system of FIG. 1, a recognition rate can be improved and false detection can be reduced.

Additional description is slightly made for the image capturing unit 10. The image capturing unit 10 illustrated in FIG. 1 includes the polarization filter 132.

The polarization filter 132 is the "area division polarization filter" obtained by two-dimensionally arraying "the polarization filter element that transmits the P polarization and the polarization filter element that transmits the S polarization".

The "image capturing unit" is not limited to one having the above-described structure.

For example, the image capturing unit may have a structure described in Japanese Patent Application Laid-Open No. 2011-29903 in which "a polarizer plate obtained by combining polarizers of a plurality of polarization directions is provided in front of an imaging lens, and an image is captured while the polarizer plate is rotated".

Alternatively, the "polarization filter that transmits the S polarization" may be combined with either one of two image capturing cameras, and the "polarization filter that transmits the P polarization" may be combined with the other image capturing camera.

Specifically, one of the cameras captures "image information that includes the S polarization information" and the other camera captures "image information that includes the P polarization information". Then, the image information of each camera is combined to obtain the polarization image.

As has been described, to the "polarization image" obtained by various image capturing units, it is possible to carry out the image processing by "superimposing the polarization information on the brightness image" as in the present invention.

Note that the above-described polarization filter 132 may have, for example, a "sub wavelength structure (SWS)".

In the above example, a "black-and-white image sensor" is presumed as the image capturing element 12. Alternatively, a color image sensor may also be adopted.

In an area of the image capturing element 12 formed with the polarization filter 132, polarization images of P and S of the areas P and S are imaged, respectively.

As described later, the polarization images of P and S are used for detecting various types of information as "an image that includes the polarization information and a brightness image".

The basis of the polarization information and superimposition thereof on the brightness image will be described below.

A reflective property of an object surface is expressed by a bi-directional reflectance distribution function (hereinafter referred to as "BRDF").

The "BRDF at a certain point" on the object surface depends on both of an incident direction and a reflection direction, and is defined as a ratio of intensity of light reflected in an observation direction to intensity of incident light from an illumination direction.

Various reflection models describing "polarization phenomena" have been proposed.

A "Torrance Sparrow model" is used as a specular reflection component and a "Lambert model" is used as a diffuse reflection component below.

Figure 2:
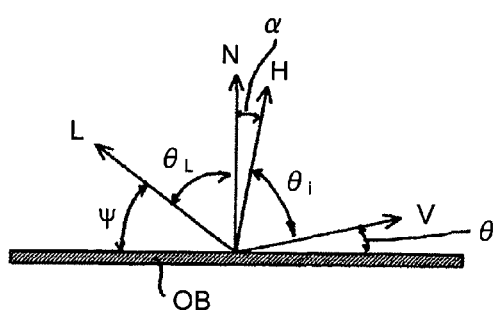
FIG. 2 is a diagram illustrating a model of reflection by an object.

FIG. 2 illustrates a model of reflection by an object OB. In FIG. 2, "N" indicates an "outward normal vector" at a reflection position of the object OB.

"L" indicates a vector directed to a light source from the reflection position and called a "light source vector". "V" indicates a vector directed to an observation position from the reflection position and called an "eye direction vector".

"H" indicates a vector of a direction of halving an angle formed between the light source vector "L" and the eye direction vector "V". Such vector is simply called a "halving direction vector".

Each of the vectors N, L, V, and H is positioned on the "same plane".

On the same plane, angles $\Psi$, $\theta_L$, $\alpha$, $\theta_i$, and $\theta$ are defined as illustrated in FIG. 2.

The "S polarization BRDF: $\rho_S(\Psi,\theta)$" by the object OB is given as follows.

$$\rho_S(\Psi,\theta)=k_S R_S(\theta_i)D+k_d \cos\theta_L \quad (A)$$

Similarly, the "P polarization BRDF: $\rho_P(\Psi,\theta)$" is given as follows.

$$\rho_P(\Psi,\theta)=k_P R_P(\theta_i)D+k_d \cos\theta_L \quad (B)$$

A first term on the right side in formulas (A) and (B) is a specular reflection model term (Torrance Sparrow model) and a second term on the right side is a diffuse reflection model term (Lambert model).

In the formulas (A) and (B), "$k_S$" indicates a specular reflection coefficient of the S polarization, "$k_P$" indicates a specular reflection coefficient of the P polarization, and "$k_d$" indicates a diffuse reflection coefficient.

"$R_S(\eta_i)$ and $R_P(\theta_i)$" are "Fresnel reflectance" relative to the S polarization and the P polarization, respectively, and given by the following formula.

$$R_S(\theta_i)=\{(n_1\cos\theta_i-n_2\cos\theta_i')/(n_1\cos\theta_i+n_2\cos\theta_i')\}^2$$

$$R_P(\theta_i)=\{(n_1\cos\theta_i'-n_2\cos\theta_i)/(n_1\cos\theta_i'+n_2\cos\theta_i)\}^2$$

where $n_1$ and $n_2$ are refraction indexes of air and the object OB, respectively.

An angle $\theta_i'$ has the following relationship with the angle $\theta_i$ and the refraction indexes $n_1$ and $n_2$.

$$\sin\theta_1'=(n_1/n_2)\sin\theta_i$$

Thus, $\theta_1'(=\arcsin\{(n_1/n_2)\sin\theta_i\}$ applies.

By the term of the Fresnel reflectance, polarization dependence property is reflected as a behavior of a reflection model.

"D" in the above formulas (A) and (B) is a "normal distribution term" of a small area at the reflection position.

The normal distribution term D is expressed as follows.

$$D=\exp(-\alpha^2/2a^2)$$

where "$\alpha$" is a central coordinate value of a distribution function and corresponds to an angle parameter "$\alpha$" in FIG. 2. Further, "$a$" is a standard deviation in the distribution function.

Note that "$\alpha$" is a "parameter on angle distribution" of the small area. The normal distribution term D is Gaussian distribution that represents normal distribution.

Next, the polarization information superimposed on the brightness image will be described. Various types of polarization information may be considered. Below, the following three types of polarization information will be described.

Specifically, the three types of polarization information are "degree of polarization", "degree of differential polarization", and "polarization ratio".

The "degree of polarization" is the quantity defined by using the well-known Stokes parameters $S_0$, $S_1$, $S_2$, and $S_3$ relating to a polarization phenomenon, and hereinafter, the degree of polarization is called "DOP".

The DOP is defined by the following formula using the Stokes parameters $S_0$ to $S_3$.

$$\mathrm{DOP}=\{\sqrt{(S_1^2+S_2^2+S_3^2)}\}/S_0$$

The "degree of differential polarization (Sub-DOP)" is the quantity defined as follows using the Stokes parameter $S_0$ and $S_1$. Hereinafter, the Sub-DOP is called "SDOP".

$$\mathrm{SDOP}=S_1/S_0=\{I(0,\phi)-I(90,\phi)\}/\{I(0,\phi)+I(90,\phi)\}$$

where $I(0,\phi)$ is the "intensity of light passing through the polarization filter" under 0 degree of an axial angle, and $I(90,\phi)$ is the intensity of light passing through the polarization filter under 90 degrees of an axial angle.

In the example of the "area division polarization filter" described above, $I(0,\phi)$ is the light-receiving intensity of the pixel that has received light having passed through the S component.

Similarly, $I(90,\phi)$ is the light-receiving intensity of the pixel that has received light having passed through the P component.

In a case of the Stokes parameter $S_2=S_3=0$, the following relationship applies.

DOP=|SDOP|

Thus, the SDOP in this case is also called the "degree of polarization".

The "polarization ratio" is the ratio between the above $I(0,\phi)$ and $I(90,\phi)$, and is defined as follows.

The polarization ratio=$I(0,\phi)/I(90,\phi)$

As described above, the polarization ratio is the "ratio between $I(0,\phi)$ and $I(90,\phi)$". Thus, the polarization ratio may be expressed as follows instead of the above.

The polarization ratio=$I(90,\phi)/I(0,\phi)$

Then, the above-defined three types of polarization information, i.e., DOP, SDOP, and any polarization ratio are superimposed on the brightness image. Accordingly, the above-described output image IMO may be obtained.

The "brightness image" may be obtained as follows.

In the embodiment described above, the polarization filter 132 at the image capturing unit 10 is the "area division polarization filter".

That is, the polarization filter 132 is obtained by two-dimensionally arraying the polarization filter element that transmits the P polarization and the polarization filter element that transmits the S polarization.

Herein, the image capture area of the image capturing element 12 is expressed by two-dimensional coordinates (x, y) and each intensity of the S polarization and P polarization received by a pixel at the position (x,y) is expressed as "$I_S(x/y)$, $I_P(x,y)$".

If the intensity is used, the brightness image $I_{bright}(x, y)$ may be expressed by the following formula (C) for easy understanding.

$$I_{bright}(x,y)=\{I_S(x,y)+I_P(x,y)\}/2 \quad (C)$$

Presuming that "computing of superimposition" is expressed by symbol [SPI], superimposition of the brightness image and the polarization information may be expressed as follows.

$I_{bright}(x, y)$ [SPI] (polarization information)

As the polarization information, any of the above-described "DOP, SDOP, and the polarization ratio" may be used.

Various types of superimpose computing may be considered, among which simple computing is the following two types.

Specifically, one of the two types is a method performed by a "linear sum", and is expressed as follows.

$I_{bright}(x,y)$[SPI](polarization information)=$I_{bright}(x,y)$+
  {$K\times$(polarization information)}

The other type is a method performed by a "multiplication" and is expressed as follows.

$I_{bright}(x,y)$[SPI](polarization information)=$I_{bright}(x,y)\times$
  {$K\times$(polarization information)}

Note that the polarization information is "superimposed on the brightness image as a change in brightness of each pixel".

Thus, at the right side of each formula of the superimpose computing, the added or multiplied pixels have equal coordinates (x,y).

In the above superimposing formula, "K" at the right side is a constant that expresses the degree of superimposing, and can be appropriately set depending on the specific superimposing condition.

The embodiment of the image processing system illustrated in FIG. 1 is configured as follows.

Specifically, the image processing system includes the brightness polarization superimposing unit 20 that superimposes the polarization information, included in the image IMP, on the brightness image as a change in brightness of each pixel.

Further, the image processing system has a function of outputting the output image IMO obtained by superimposition by the brightness polarization superimposing unit 20.

The image processing system illustrated in FIG. 1 includes the image capturing unit 10. The image capturing unit 10 captures the image IMP that includes the polarization information and is to be subjected to superimposition processing by the brightness polarization superimposing unit 20.

The brightness polarization superimposing unit 20 superimposes the polarization information and the brightness image. The superimposition may be performed as the linear sum or the multiplication.

The superimposed polarization information may be the degree of polarization (DOP), the degree of differential polarization (SDOP), or the "polarization ratio".

The image processing system may include noise reduction unit that removes noise from the polarization information prior to superimposing on the brightness image.

With the model of reflection described above, the polarization of the reflected light may be expressed by variables such as the material quality of the object OB (refraction index, surface condition, and internal scattering coefficient), an angle formed between the light source and the object, and an angle formed between the object and an observation point.

In other words, the above-described polarization may be expressed by the following formula (D).

Polarization=$F$(condition of light source,material quality, and angle) (D)

where F indicates a function.

In this formula, each variable is as follows.

Condition of light source=angle distribution of $\Psi$
Material quality=$k_S$, $k_P$, $k_d$, $n_2$ and the like
Angle=$\theta$ The formula (D) associates the "polarization information" of the left side with the "light source material, material quality, and angle" of the right side.

Thus, among "the light source, the material quality, and the angle" of the right side, if any two elements are determined, the remaining one element is determined.

According to the description made above by referring to FIG. 1, it is presumed that "the light source is invariable".

Thus, the above-described embodiment is effective for superimposing the polarization image obtained by capturing an image in "a room where illumination is invariable".

At the reflection model described above, the term (term of Rs and Rp) that expresses the "specular light by the regular reflection" at the surface of the object OB is an important quantity that characterizes the polarization.

If the object OB to be observed forms the same angle with the image capturing unit 10 and with the light source, the specular light is hardly returned. As a result, the "polarization information may not be obtained".

Such difficulty is present when the light source cannot be controlled. Thus, if the image processing system is to be applied to a case such as vehicle-mounting in which the light source cannot be fixed, the consideration below is necessary.

The polarization is in relationship as indicated in the formula (D). Thus, with the vehicle-mounted camera that does not project the irradiation light, the "polarization information included in the polarization image" changes depending on the condition of the light source.

For example, even when "the road surface and the white line formed of different materials" are distinguished, the polarization information (for example, SDOP) changes depending on the condition of the light source.

Although the polarization information changes also depending on the angle, if the "image capturing unit is fixed at a predetermined position of the vehicle and the object on the road surface having the same angle" is imaged, the change of the polarization information caused by the angle can be ignored.

When the "object is recognized" using the output image IMO obtained by superimposing the brightness image on the polarization information, it is necessary to recognize the object using some sort of a "characteristic quantity" which characterizes the object.

In this case, if the polarization by the object alone is regarded as the characteristic quantity, the characteristic quantity is "influenced by the condition of the light source".

In such a case, it is necessary to adopt the "characteristic quantity which utilizes the polarization" not depending on the condition of the light source.

According to the above-described formulas (A) and (B), the magnitude of the reflection intensity of the S polarization and the P polarization changes by the height of the light source (determined by the angle $\Psi$ or the angle $\theta_L$ in FIG. 2).

Note that the magnitude of the reflection intensity of the P polarization is always larger than that of the S polarization.

Further, the larger the surface reflection (in other words, the smaller the internal scattering), the larger the "difference in the reflection intensity" between the S polarization and the P polarization.

When the image processing system is actually mounted on a vehicle, it is considered that "in case of capturing image with direct light, almost all objects to be imaged receive direct light illumination".

Reversely, it is considered that "in case of capturing an image with back light, almost all objects to be imaged receive back light illumination".

In view of the above facts, it is considered that, when various objects are imaged, the polarization information such as the above-described SDOP (degree of differential polarization) is subject to, on average, "deviation of values between the direct light and the back light".

Considering such circumferences, the "characteristic quantity" may be preferably selected based on a policy described below.

(1) The influence of the condition of the light source such as the direct light and the back light is roughly canceled by removing the "offset in the polarization information such as the SDOP of the entire screen".

The "offset" is the "deviation of values caused between the direct light and the back light" in the polarization information:

(2) In a direct light state, in other words, in a case where an angle formed between the image capturing unit and the object and an angle formed between the light source and the object are similar, originally, the "polarization information becomes small".

Thus, in such a case, it is estimated that "there is no polarization information". Only when the polarization information is available, the polarization information is added to the characteristic quantity.

As a result, when the polarization information is available, superimposing the polarization information makes it possible to "more favorably recognize an image than the case of using the normal brightness image".

(3) According to the above-described formulas (A) and (B), at capturing an image by the direct light, $I(0,\phi)$ is equal to $I(90,\phi)$, and thus, "SDOP=0" should apply. However, according to the actual measurement result, the SDOP is not zero.

The SDOP also differs depending on the material quality of the reflection object.

In view of this fact, "a coefficient that allows the SDOP to contribute to the characteristic quantity" is made adjustable between the case of direct light and the case of back light.

For the "determination of whether the direct light or light other than the direct light", the SDOP (degree of polarization) of the entire screen is used.

(4) The "characteristic quantity is close to the brightness" such that an algorithm using normal brightness information can be adopted.

Roughly speaking, as the degree of polarization, "only the relative quantity" is considered instead of the absolute quantity.

Without depending on the condition of the light source, "information on the magnitude of the surface reflection of the object (magnitude of diffusion)" is added to the brightness information depending on the use condition to thereby obtain the characteristic quantity.

The SDOP (degree of polarization) largely varies depending on the angle $\Psi$ of the light source.

However, with respect to the angles $\theta_i$ and $\theta_L$ in FIG. 2, when viewed at certain angles $\theta_i 1$ and $\theta_L 1$, the magnitude relationship of the SDOP between the material quality A and the material quality B may be A>B. In this case, even when viewed at other angles $\theta_i 2$ and $\theta_L 2$, the magnitude relationship of the SDOP is often A>B.

A case will be described below in which "if the magnitude relationship of the SDOP between the material quality A and the material quality B is A>B when viewed at certain angles, the magnitude relationship of the SDOP is A>B also when viewed at other angles".

Examples of parameters that represent the material quality include the above-described $k_p$, $k_s$, $k_d$, $n_2$, and a.

Thus, the following condition is derived: when the parameters change, the direction of the value change (i.e., increasing or decreasing the value) of the SDOP does not depend on the angle.

As has been described, the "SDOP" can be expressed as follows.

$$SDOP=S_1/S_0=\{I(0,\phi)-I(90,\phi)\}/\{I(0,\phi)+I(90,\phi)\}$$

If this formula is expressed by using the above-described $n_1$, $n_2$, $\theta_i$, $\theta_i'$, $\theta_L$, $k_s$, $k_d$, $\alpha$, and a, the formula is as follows.

$$SDOP=[k_s\{(n_1 \cos \theta_i - n_{h2} \cos \theta_i')/(n_1 \cos \theta_i - n_2 \cos \theta_i')\}\exp\{(-\alpha^2)/2a^2\} + k_d \cos \theta_L - k_s\{(n_1 \cos \theta_i - n_{h2} \cos \theta_i')/(n_1 \cos \theta_i + n_2 \cos \theta_i')\}\exp\{(-\alpha^2)/2a^2\} - k_d \cos \theta_L]/[k_s\{(n_1 \cos \theta_i - n_{h2} \cos \theta_i')/(n_1 \cos \theta_i - n_2 \cos \theta_i')\}\exp\{(-\alpha^2)/2a^2\} + k_d \cos \theta_L + k_s\{(n_1 \cos \theta_i - n_{h2} \cos \theta_i')/(n_1 \cos \theta_i + n_2 \cos \theta_i')\}\exp\{(-\alpha^2)/2a^2\} - k_d \cos \theta_L] \quad (4\text{-}1)$$

For simplification of descriptions, the "geometrical damping term" is ignored.

Next, under the presumption that the beam is "incident through the air", in the above-described Fresnel reflectance:

$$R_S(\theta_i) = \{(n_1 \cos \theta_i - n_2 \cos \theta_i')/(n_1 \cos \theta_i + n_2 \cos \theta_i')\}^2$$

$$R_P(\theta_i) = \{(n_1 \cos \theta_i - n_2 \cos \theta_i)/(n_1 \cos \theta_i' + n_2 \cos \theta_i)\}^2,$$

$n_1 = 1$ is satisfied. For $R_S$ of the Fresnel reflectance at this time, "$R_S(n_2)$" applies and for $R_P$, "$R_P(n_2)$" applies.

Then, the above is as follows.

$$R_S(n_2) = \{(\cos \theta_i - n_2 \cos \theta_i')/(\cos \theta_i + n_2 \cos \theta_i')\}^2$$

$$R_P(n_2) = \{(\cos \theta_i' - n_2 \cos \theta_i)/(\cos \theta_i' + n_2 \cos \theta_i)\}^2$$

Using $R_S(n_2)$ and $R_P(n_2)$, the above (4-1) formula becomes as follows.

$$SDOP = [k_s \bullet \exp\{(-\alpha^2)/2a^2\} \bullet \{R_S(n_2) - R_P(n_2)\}]/[k_s \bullet \exp\{(-\alpha^2)/2a^2\} \bullet \{R_S(n_2) + R_P(n_2)\} + 2k_d \cos \theta_L] \quad (4\text{-}2)$$

The formula (4-2) is the "theoretical formula of the SDOP" at the above-described model.

Herein, a parameter $k = k_s/k_d$ that indicates "the ratio between the specular reflection component and the diffuse component" is introduced. Using the parameter k, the formula (4-2) becomes as follows.

$$SDOP = [k \bullet \exp\{(-\alpha^2)/2a^2\} \bullet \{R_S(n_2) - R_P(n_2)\}]/[k \bullet \exp\{(-\alpha^2)/2a^2\} \bullet \{R_S(n_2) + R_P(n_2)\} + 2 \cos \theta_L] \quad (4\text{-}3)$$

The formula (4-3) includes k, n2, and a as parameters associated with the material quality of the reflection object. The change of the SDOP caused by the change of the parameters is observed.

For this purpose, first, the formula (4-3) is partially differentiated by the parameter k.

Additionally note that the parameter k in the description is different from the "polarization information superimpose coefficient k" described later.

For simplification, the following symbols are introduced.

$$f1 = \exp\{(-\alpha^2)/2a^2\} \bullet \{R_S(n_2) - R_P(n_2)\}$$

$$g1 = 2 \cos \theta_L$$

$$h1 = \exp\{(-\alpha^2)/2a^2\} \bullet \{R_S(n_2) + R_P(n_2)\}$$

Using the symbols, the formula (4-3) becomes as follows.

$$SDOP = k \bullet f1/[k \bullet h1 + g1]$$

Thus, the following applies. Partial differentiation by k of the SDOP:

$$\partial\{SDOP\}/\partial k = \partial\{k \bullet f1/[k \bullet h1 + g1]\}/\partial k \quad (4\text{-}4)$$

$$= (h1/f1)[(g1/f1)/\{(g1/f1) + k\}^2].$$

The angle $\theta_L$ is in the range of $-2/\pi \leq \theta_L \leq 2/\pi$. Thus, any of the above f1, g1, and h1 may only take a positive value within the fluctuation range of $\theta_L$.

Thus, the formula (4-4) becomes $\partial\{SDOP\}/\partial k \geq 0$.

Next, the SDOP is partially differentiated by the parameter a.

For the simplification of the formula, the following symbols are introduced also in this formula.

$$f2 = k\{R_S(n_2) - R_P(n_2)\}$$

$$g2 = k\{R_S(n_2) + R_P(n_2)\}$$

$$h2 = 2 \cos \theta_L$$

Then, the following applies:

$$\partial(SDOP)/\partial a = \partial\{\exp\{(-\alpha^2)/2a^2\}/[\exp\{(-\alpha^2)/2a^2\} + h2]\}/\partial a \quad (4\text{-}5)$$

$$= (f2/g2)[(h2/g2)\alpha^2 \exp\{(-\alpha^2)/2a^2\}/\{a^3\{\exp\{(-\alpha^2)/2a^2\} + (h2/g2)\}\}].$$

In this case also, f2, g2, and h2 only take positive values. Further, "a" is a standard deviation in the distribution function, and thus, is positive.

Accordingly, the right side of the formula (4-5) is always positive.

Similarly, the SDOP is partially differentiated by the parameter a.

In this case also, for simplification of the formula, the following symbols are introduced.

$$f3 = k \bullet \exp\{(-\alpha^2)/2a^2\}$$

$$g3 = 2 \cos \theta_L$$

Then, the following applies:

$$\partial(SDOP)/\partial n_2 = \partial\{f3\{R_S(n_2) - R_P(n_2)\}\}/\{f3\{R_S(n_2) + R_P(n_2)\} + g2\}]/\partial n_2 = [\{(g3/f3) + 2R_P(n_2)\}\{\partial R_S(n_2)/\partial n_2\} - \{(g3/f3) + 2R_S(n_2)\}\{\partial R_P(n_2)/\partial n_2\}]/[R_S(n_2) + R_P(n_2) + (g3/f3)] \quad (4\text{-}6).$$

Considering a case of $G3/f3 \gg 2R_P(n_2)$ and $G3/f3 \gg 2R_S(n_2)$, the numerator of the formula (4-6) becomes as follows.

$$[\{(g3/f3) \bullet \partial R_S(n_2)/\partial n_2\} - \{(g3/f3) \bullet \partial R_P(n_2)/\partial n_2\}]$$

Further, it is considered that between $\partial R_S(n_2)/\partial n_2$ and $\partial R_P(n_2)/\partial n_2$, the following relationship applies: $\partial R_S(n_2)/\partial n_2 > \partial R_P(n_2)/\partial n_2$.

Thus, when both $G3/f3 \gg 2R_P(n_2)$ and $G3/f3 \gg 2R_S(n_2)$ apply, $\partial(SDOP)/\partial n_2$ always becomes positive.

Herein, $g3/f3 = 2 \cos \theta_L/k \bullet \exp\{(-\alpha^2)/2a^2\} = 2k_d \cos \theta_L/k_s \bullet \exp\{(-a^2)/2a^2\}$ applies. The numerator indicates the "diffuse reflection component" and the denominator indicates the specular component (including the distribution by micro facet).

Further, considering $R_P(n_2) \leq 1$ and $R_S(n_2) \leq 1$, and when the diffuse component has a certain quantity or more relative to the specular component, both are approximate.

In other words, $\partial(SDOP)/\partial n_2 \geq 0$ applies.

In other words, when the diffuse component has a certain quantity or more relative to the specular component, for the change of the parameters k, a, and $n_2$, the partial differential coefficient of the SDOP is positive.

Thus, for the change of the parameters k, a, and $n_2$, the change of the SDOP is monotonous and does not depend on the angles $\theta_i$ and $\theta_L$.

Generally, "the diffuse component is large relative to the specular component" in an "object with a surface other than a specular surface", and there are many such objects satisfying the above condition.

Thus, if the magnitude relationship of the SDOP between the material quality A and the material quality B is A>B when viewed at certain angles $\theta_i 1$ and $\theta_L 1$, the magnitude relationship of the SDOP is often A>B even when viewed at other angles $\theta_i 2$ and $\theta_L 2$.

The SDOP largely depends on the material quality $k_d$ and "the magnitude of $k_d$" of the object to be imaged.

For example, upon making offset to 0 with the SDOP of the material quality A as a reference, whether the SDOP of the material quality B becomes positive or negative often does not depend on the angle of the light source.

In view of this, by removing the offset of the SDOP of the entire screen, "only the relative relationship for each material quality" can be retrieved without depending on the angle of the light source.

According to the reflection model theory by the formulas (A) and (B), the nearer the image capturing condition is to the direct light, the closer the SDOP is to zero.

Thus, if the SDOP is used as the polarization information, the nearer the light source condition is to the direct light, the smaller the SDOP in theory. As a result, there is no longer "contribution to the characteristic quantity of the polarization".

However, according to the actual experimental result, values of the SDOP vary even at the direct light depending on the material quality.

The magnitude relationship of the fluctuation of the values of the SDOP at the direct light is different from the "magnitude relationship at the back light". Thus, at the direct light, the fluctuation is detected, and the coefficient that allows the polarization information to contribute to the characteristic quantity is made variable.

Further, the "tendency of the SDOP to change depending on the light source angle $\Psi$" is similar even though the material quality of an object to be imaged is different.

Then, based on the presumption that the entire image captur screen receives the "light source light from the same angle", whether the direct light applies or the back light applies is determined using the value of the SDOP of the entire screen.

Considering the above policy, the "characteristic quantity" used for the image recognition is determined as follows.

The brightness image $I_{bright}(x,y)$ is obtained by the image capturing unit 10 that includes the polarization filter 13 described with reference to FIG. 1. The brightness image is expressed by the above-described formula (C).

The "S polarization brightness image $I_S(x,y)$" and the "P polarization brightness image $I_P(x,y)$" of the brightness image $I_{bright}(x,y)$ are as described above.

First, the characteristic quantity $I_{bright\_por}(x,y)$ (output image) to which the polarization information is added is determined as "Mathematical formula 1" below.

$$I_{bright\_por}(x, y) = I_{bright}(x, y) + k\left[SDOP(x, y) - \frac{\left(\sum_x^X \sum_y^Y SDOP(x, y)\right)}{X \cdot Y}\right] \quad (1)$$

In Mathematical formula 1, the "SDOP(x, y)" is defined by the next formula.

$SDOP(x,y) = \{I_S(x,y) - I_P(x,y)\}/\{I_S(x,y) + I_P(x,y)\}$

Figure 3:
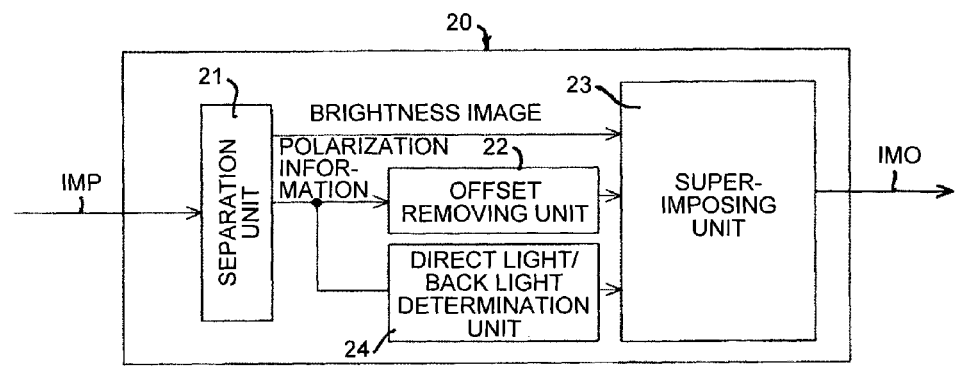
FIG. 3 is a diagram illustrating another embodiment of the image processing system.

FIG. 3 illustrates a configuration example of the brightness polarization superimposing unit 20 when information processing is performed in this case.

Note that for simplification, reference numeral 20 as in FIG. 1 is given to the brightness polarization superimposing unit.

The polarization image IMP obtained from an image capturing unit (not illustrated; similar to the image capturing unit 10 in FIG. 1) is input to a separation unit 21 of the brightness polarization superimposing unit 20.

The separation unit 21 separates the input polarization image IMP into the brightness image and the polarization information.

The brightness image is the image information expressed by the above-described formula (C) and is input to a superimposing unit 23.

On the other hand, the polarization information, separated by the separation unit 21 is any of the above-described "DOP, SDOP, and polarization ratio". Here, it is presumed that the polarization information is the "SDOP".

The "SDOP", which is the polarization information, is input to an offset removing unit 22, and at the same time, input to a direct light/back light determination unit 24.

The function of the "direct light/back light determination unit 24" will be described later.

For the input polarization information (SDOP), the offset removing unit 22 performs computing of the "second term in brackets" of the right-side second term of the above "Mathematical formula 1".

The computation result is subtracted from the input polarization information (SDOP).

The "second term in brackets" of the right side of Mathematical formula 1 gives an "average of the SDOP" in "a certain area range" determined by X, Y on the image.

Any selection method is applicable for the "area range" determined by X, Y.

In the described example, as described above, the "influence of the light source condition is canceled using the entire screen".

The image area determined by X, Y corresponds to an area obtained by removing "the sky area from the entire screen".

The average of the SDOP computed as above for such an image area is the "offset" and the offset removing unit 22 subtracts the offset.

The "polarization information thus obtained by removing the offset" is input to the superimposing unit 23 to be superimposed with the brightness image. Note that sometimes the "brightness image" is called "brightness information" below.

As illustrated in the right side of Mathematical formula 1, this superimposition is performed on the brightness image $I_{bright}(x,y)$ by taking the linear sum of the "quantity in brackets of the right side of Mathematical formula 1" obtained by removing the offset.

At this time, the coefficient k before the brackets of the second term on the right side of Mathematical formula 1 is multiplied by the "quantity in the brackets" to be added. The coefficient k is called a "polarization information superimposing coefficient".

The polarization information superimposing coefficient k is determined as Mathematical formula 2 and Mathematical formula 3 below depending on whether the illumination is "direct light" or "light other than the direct light".

$$k = k_1 \text{ if } \frac{\left(\sum_x^X \sum_y^Y SDOP(x, y)\right)}{X \cdot Y} \geq \quad (2)$$

$TH$(when light is other than direct light)

-continued $$k = k_2 \text{ if } \frac{\left(\sum_{x}^{X}\sum_{y}^{Y} SDOP(x, y)\right)}{X \cdot Y} < TH \text{(when light is direct light)} \quad (3)$$

The direct light/back light determination unit 24 computes to determine "a value of k" of Mathematical formula 2 and Mathematical formula 3. The direct light/back light determination unit 24 is a "direct light/back light determination unit".

Here, $k_1$ and $k_2$ are the "polarization information superimposing coefficients".

"TH" is a "threshold value" and is set such that "the direct light can be recognized".

As described above, according to the reflection model theory by the formulas (A) and (B), the nearer the image capturing condition is to the direct light, the closer the SDOP is to zero.

Thus, the nearer the image capturing condition is to the direct light, the smaller the offset quantity which is the "average value of the SDOP in the predetermined image area".

Then, the magnitude relationship between the threshold value TH and the offset quantity is determined. If the offset quantity is smaller than the threshold value TH, it is determined that the light source condition (image capturing condition) is the direct light.

Reversely, if the offset quantity is larger than the threshold value TH, it is determined that the light source condition is "not the direct light" such as the back light.

In other words, when the above-described "offset" is smaller than the threshold value TH, the direct light/back light determination unit 24 determines that the light source condition is the direct light and sets the polarization information superimposing coefficient k to $k_2$.

Reversely, when the above-described "offset" is larger than the threshold value TH, the direct light/back light determination unit 24 determines that the light source condition is not the direct light and sets the polarization information superimposing coefficient k to $k_1$.

The average computation in calculating the offset is made for the "image area by X, Y". The image, area may be the entire screen which includes the sky area.

However, in the sky, the "polarization state differs depending on the position of the sun". Therefore, it is preferable to remove the sky area in order to obtain a better result.

For example, if the image processing system is used for the purpose of detecting the "white line on the road surface" of the road, when the light is other than the direct light, the surface reflection of the white line is smaller than that of the road surface and the SDOP of the white line becomes smaller.

In this case, therefore, by setting the "polarization information superimposing coefficient $k_1$ to be negative", the brightness difference between the white line and the asphalt (the brightness of which is lower than that of the white line) can be "more emphasized".

When the light is the direct light, the "SDOP relationship between the white line and the asphalt" is reversed. Thus, it is desirable that the "polarization information superimposing coefficient $k_2$ be a positive value or zero".

If $k_2$ is set to zero, "superimposition of the polarization information is not performed".

In the above, the SDOP is used as the polarization information. Needless to say, the above-described DOP and polarization ratio can be used instead of the "SDOP" in Mathematical formula 1 to Mathematical formula 3.

In order to obtain the polarization information, "subtraction and division" are used. Thus, noise is easily amplified.

Thus, it is preferable to perform noise reduction processing such as weighted averaging and a median filter or an "$\epsilon$ filter" to the image that indicates the obtained "polarization information such as the SDOP".

For example, the obtained polarization image may have a "saturation area".

After the quantity of light to be received exceeds a certain level, even if the light quantity increases beyond that point, the output value output by each pixel of the image capturing element is constant and does not change.

Therefore, if $I_S(x, y)$ and $I_P(x, y)$ are "an expressible maximum value or more, or an expressible minimum value or less", correct polarization information cannot be obtained by computing.

In such a case, it is preferable to set the value of the polarization information superimposing coefficient k to zero or to "output a predetermined constant" because computing is impossible, in order to prevent "superimposing on the area".

Note that in the embodiment in FIG. 3, the direct light/back light determination unit 24 can be omitted and the polarization information superimposing coefficient k to be multiplied by the brackets of the right side of Mathematical formula 1 can be fixed.

The embodiment of this case (image processing system) includes the brightness polarization superimposing unit 20 that superimposes the polarization information, included in the image IMP, on the brightness image as the change in brightness of each pixel.

Further, the image processing system has a function of outputting an image obtained by superimposition by the brightness polarization superimposing unit 20 as the output image IMO.

Regarding the average value of the polarization information of the image IMP in a predetermined range on the image as the offset quantity, the brightness polarization superimposing unit 20 subtracts the value from the polarization information.

Accordingly, the output image IMO from which the offset has been removed can be obtained.

According to this embodiment of the image processing system, the influence of the light source condition such as the direct light and the back light can be roughly canceled by "removal of the offset of the polarization information of the entire screen".

Thus, the polarization information can be used with the light source dependence property effectively reduced.

According to the above-described embodiment, the offset removing unit 22 regards the degree of differential polarization (SDOP) of the image that includes the polarization information as the polarization information and performs the image processing based on computing of Mathematical formula 1 to Mathematical formula 3.

However, as described above, as the polarization information for computing the offset quantity, the degree of polarization (DOP) and the "polarization ratio" can also be used without limitation to the degree of differential polarization.

The offset removing unit 22 adopts an area, obtained by removing the sky area from the entire area of the image, as the "predetermined range" for which the average value of the polarization information of the image is computed.

However, without being limited to the above, the "predetermined range" may be the "entire area of the image that includes the polarization information".

The embodiment of the image processing system has been described above, and the image processing system includes the direct light/back light determination unit 24 as the "direct light/back light determination unit".

The direct light/back light determination unit 24 uses the polarization information of the image to determine whether the image capturing condition is the direct light or the back light.

According to the above-described embodiment, the direct light/back light determination unit 24 uses the average value of the degree of differential polarization (SDOP) to determine whether the image capturing condition is the direct light or the back light.

However, without being limited to the above, whether the image capturing condition is the direct light or the back light can be determined by using the average value of the degree of polarization (DOP) or the average value of the polarization ratio.

Upon determining that the image capturing condition is the direct light, the direct light/back light determination unit 24 changes the superimposing quantity (k) of the polarization information on the brightness image.

In this case, upon determining that the image capturing condition is the direct light, the direct light/back light determination unit 24 may change the superimposing quantity of the polarization information on the brightness image to zero.

As described above, it is preferable to perform each computing as a result of performing the noise reduction processing to the polarization image.

Specific examples will be described below.

Specific Example 1

Figure 4A:
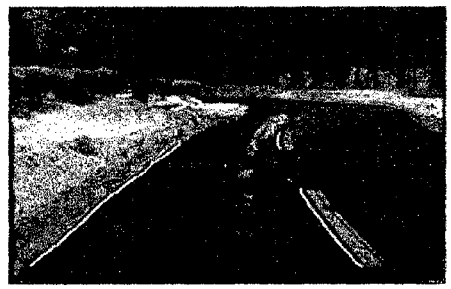
FIGS. 4A and 4B are views illustrating an example of a brightness image and a brightness polarization superimposed image of the same object to be imaged.
Figure 4B:

FIGS. 4A and 4B illustrate the brightness image $I_{bright}(x, y)$ and the brightness polarization superimposed image $I_{bright\_por}(x, y)$.

The images are computed by using Mathematical formula 1, and the threshold value TH in Mathematical formula 2 and Mathematical formula 3 for computing the polarization information superimposing coefficient k is "TH=−∞".

With respect to each of coefficients $k_1$ and $k_2$ computed by Mathematical formula 2 and Mathematical formula 3, $k_1$=−300 and $k_2$=0 are satisfied.

In other words, by setting the threshold value TH to −∞, any average value of the polarization information (SDOP) exceeds the threshold value and the average value smaller than the threshold value TH is not present.

Thus, $k_2$=0 applies.

In other words, in Specific example 1, whether the image capturing condition is "the direct light or light other than the direct light" is not determined.

FIG. 4B illustrated the brightness image $I_{bright}(x, y)$ at this time. FIG. 4A illustrates the brightness polarization superimposed image $I_{bright\_por}(x, y)$.

In computing the brightness polarization superimposed image $I_{bright\_por}(x, y)$, whether the light is "the direct light or light other than the direct light is not determined", and each of the coefficient $k_1$ (light other than the direct light) and the coefficient $K_2$ (light is the direct light) is constant.

As described above, $k_1$=−300 and $k_2$=0 apply. Thus, the polarization information superimposing coefficient k is regarded as $k_1$ in Mathematical formula 1, and always the same quantity of the degree of polarization (SDOP) is superimposed on the brightness image.

In the brightness image $I_{bright}(x, y)$ of FIG. 4B, the "white line" on the road surface is not seen.

However, in the brightness polarization superimposed image $I_{bright\_por}(x, y)$ illustrated in FIG. 4A, the "white line" is clearly seen and can be recognized within the image.

Further, the "boundary between the asphalt and the snow" at the shoulder is also clearly recognized.

As illustrated in FIG. 4A, by superimposing the polarization information on the brightness image, the contrast of the end of road and the contrast of the shaded portion are improved and the unnecessary reflection by the wet road surface is removed.

Further, the "object such as black ice which is invisible with a bare eye" is also detected.

Thus, as compared with the general image capturing device, this system can handle a harsher condition.

The "algorithm of the subsequent stage such as the white line recognition" for the output brightness polarization superimposed image can be used without changing the "algorithm for the brightness image" of the related art.

In the above example, as the "linear sum (Mathematical formula 1) of the polarization information and the brightness image", the brightness polarization superimposed image is generated. However, there is also a method of generating the brightness polarization superimposed image as the "multiplication of the polarization information and the brightness image".

As one example of this case, for example, if the above-described SDOP(x,y) is used as the polarization information, superimposing computing becomes the following Mathematical formula 4.

Then, the polarization brightness superimposed image $I_{bright\_por}(x, y)$ which is the characteristic quantity (image) to which the polarization is added is obtained.

$$I_{bright\_por}(x, y) = I_{bright}(x, y) \cdot k \left[ \frac{SDOP(x, y)}{\frac{\left( \sum_{x}^{X} \sum_{y}^{Y} SDOP(x, y) \right)}{X \cdot Y}} \right] \quad (4)$$

In other words, the quantity in brackets of the right side of Mathematical formula 4 is regarded as the "polarization information". Such polarization information is superimposed on the brightness image $I_{bright}(x,y)$ using the brightness polarization superimposing coefficient k.

Computing is performed for each pixel, and multiplication is performed with the "pixel of the same coordinates" SDOP(x, y) and $I_{bright}(x, y)$.

As described below, in the image area by X, Y, the "threshold value TH that can distinguish between when the light is the direct light and the light is other than the direct light for the average value of the polarization ratio" is set with respect to the brightness polarization superimposing coefficient k.

Using this threshold value, k is set according to Mathematical formula 5 and Mathematical formula 6 below.

$$k = k_1 \text{ if } \frac{\left( \sum_{x}^{X} \sum_{y}^{Y} \text{polarization ratio}(x, y) \right)}{X \cdot Y} \geq \quad (5)$$

TH(when light is other than direct light)

-continued $$k = k_2 \text{ if } \frac{\left(\sum_{x}^{X}\sum_{y}^{Y} \text{polarization ratio}(x, y)\right)}{X \cdot Y} < \quad (6)$$

TH(when light is direct light)

In this example, it is determined whether the light is the direct light or the "light other than the direct light (such as the back light)" based on the magnitude of the "average value of the polarization ratio" instead of the SDOP.

With respect to the image capturing condition, the "light source conditions" are different between the daytime and the nighttime.

In other words, the daytime is in the illumination state by sun beam and the nighttime is in the illumination state by the headlight of a vehicle and a street lamp.

In view of this, it is preferable that the values of brightness polarization superimposing coefficients $k_1$ and $k_2$ be changed between the daytime and the nighttime".

The determination of the daytime and the nighttime can be made from on/off information of the switch of the headlight and, when automatic exposure control is made, by detecting the surrounding brightness based on the exposure quantity.

Additionally, depending on the weather condition such as "under the direct daylight or cloudy", switching of the values of $k_1$ and $k_2$ can yield a better effect.

Under the direct daylight, the illumination intensity of a target is high. Thus, when the automatic exposure control is made, it is possible to determine whether the "illumination is under the direct daylight or cloudiness" based on the detection from the exposure quantity.

According to the embodiment described with reference to FIGS. 3 and 4, the image processing system includes the image capturing unit (not illustrated in FIG. 3). The image capturing unit captures an image that includes the polarization information to which the superimposing processing is performed by the brightness polarization superimposing unit 20.

Further, the image processing system includes a light source condition determination unit 24. The light source condition determination unit 24 makes a "determination by assuming the light source condition".

The brightness polarization superimposing unit 20 changes a method of superimposing the polarization information on the brightness image depending on the output of a light source information determination unit 24.

Furthermore, the image processing system may include a "daytime/nighttime determination unit". The daytime/nighttime determination unit makes a determination by assuming whether the image capturing time by the image capturing unit is the daytime or the nighttime.

The brightness polarization superimposing unit can change a method of superimposing the polarization information on the brightness image depending on the output of the daytime/nighttime determination unit.

The daytime/nighttime determination unit may use a unit for obtaining the "on/off information of the switch of the headlight" and, when the automatic exposure control is made, a unit for detecting the surrounding brightness based on the exposure quantity.

Further, the values of the brightness polarization superimposing coefficients $k_1$ and $k_2$ can be switched depending on the weather such as under the direct daylight or the cloudiness to thereby change the superimposing method.

The "light source information determination unit" in this case may make a determination based on the detection from the exposure quantity at the automatic exposure control.

According to the embodiment illustrated in FIGS. 3 and 4, the image processing system includes the offset removing unit 22 as a "polarization information offset removal unit".

The offset is removed by subtracting, from the polarization information, the "average value of the polarization information in the predetermined range" of the image that includes the polarization information.

The "polarization information from which the offset has been removed" is superimposed on the brightness image.

The polarization information offset removal unit divides, by the degree of polarization or the degree of differential polarization, the average value of the degree of polarization or the degree of differential polarization in the predetermined range of the image that includes the polarization information.

The "predetermined range for obtaining the average value of the polarization information" may be the entire area of the image that includes the polarization information and also may be the "area obtained by removing the sky area from the entire area of the image that includes the polarization information".

Further, the image processing system may include a direct light/back light determination unit. The direct light/back light determination unit estimates and determines whether the image capturing condition of the image that includes the polarization information is the direct light or the back light based on the information of the captured image.

This "direct light/back light determination unit" can determine the image capturing condition based on the degree of polarization or the degree of differential polarization of the captured image that includes the polarization information (Mathematical formula 2 and Mathematical formula 3 above).

The direct light/back light determination unit can determine whether image capturing has been performed under the direct light or the back light based on the "average value of the polarization ratio of the entire screen" of the image that includes the polarization information (Mathematical formula 5 and Mathematical formula 6).

As described above, when the direct light/back light determination unit determines that the image capturing condition is the direct light, it is preferable to change the superimposing quantity of the polarization information on the brightness image to zero.

When the direct light/back light determination unit determines that the image capturing condition is the direct light, it is possible to change the superimposing quantity of the polarization information on the brightness image.

As in the embodiment below, the brightness polarization superimposing unit can determine whether a value based on the brightness image is output or a fixed value is output, based on the value of each area of the image that includes the polarization information.

In this embodiment, the polarization information is superimposed on the brightness image based on an algorithm different from the above-described algorithm.

If an "unnecessary object other than an object to be recognized can be removed" when various types of object recognition processing are performed, false recognition can be reduced.

In this manner, improvement of the performance of the object recognition processing and "reduction of the processing quantity" are possible.

With the "algorithm of brightness polarization superimposing" in this case, "the brightness image with a value of the polarization information such as the SDOP falling within a predetermined range is output".

Formulas for carrying out this method using SDOP(x, y) as the polarization information are indicated below.

$$I_{bright\_por}(x,y) = k \bullet I_{bright}(x,y) \quad (E)$$

$$k = k_1 \text{ if } SDOP(x,y) \geq TH \quad (F)$$

$$k = k_2 \text{ if } SDOP(x,y) < TH \quad (G)$$

Among the formulas (E) to (G), SDOP(x, y), $I_{bright\_por}$(x, y) and $I_{bright}$(x, y) are as defined above.

The threshold value TH is set such that "the object other than the detected object is removed from the output image using the polarization information" and depending on the magnitude relationship between SDOP(x, y) and TH, the polarization information superimposing coefficient k is switched.

Note that in order to remove the influence of the light source, by previously using the "polarization information offset removal unit", the result obtained by performing the "subtraction of the offset" which has been described based on Mathematical formula 1 can be used.

As above, if the polarization information after subtracting the offset is used to compute the above formulas (E) to (G), the possibility to receive the "influence of the angle of the light source" is reduced.

Thus, when an image is captured outdoors, the "influence of the position of the sun" can be reduced.

In computing of the formulas (E) to (G), the SDOP has been used as the polarization information, but of course, the above-described DOP and the polarization ratio may be used.

It is preferable to perform the computing based on the result obtained by performing the noise reduction processing such as weighted averaging and the median filter or the ϵ filter to the "image that indicates the polarization information" such as the SDOP.

When there is a "saturation area on the obtained image", in order to "stop superimposing" for the area, it is preferable to set the value of k to zero or to output a predetermined constant by assuming that computing is impossible.

A specific example of the embodiment described above will be described below.

Specific Example 2

Specific example 2 indicates that in the above computing formulas (E) to (G), $k_1$0, $k_2$=1, and TH=0.15 apply.

In other words, in this example, the "brightness image itself" is output from the pixel in which the SDOP becomes smaller than the threshold value TH.

In the pixel in which the SDOP becomes larger than the threshold value TH, "superimposition of the polarization information" is not performed.

This example presumes "a case of counting the number of vehicles" on the road.

Figure 5A:
FIGS. 5A and 5B are views illustrating another example of the brightness image and the brightness polarization superimposed image of the same object to be imaged.
Figure 5B:

FIGS. 5A and 5B illustrate the obtained brightness image and brightness polarization superimposed image.

FIG. 5A illustrates the brightness polarization superimposed image and FIG. 5B illustrates the brightness image.

In the brightness image illustrated in FIG. 5B, the light of the vehicle and the reflected light by the road surface are "obstacles of the vehicle detection".

The "light of the vehicle and the reflected light by the road surface" are types of back light. In the polarization image for the object to be imaged, the "SDOP" is large.

At the pixel in which the SDOP is large enough to exceed the threshold value TH, the output of the brightness image is set to zero.

At the pixel in which the SDOP is smaller than the threshold value TH, $k_2$=1 applies, and the "brightness image itself" is output.

At the "pixel in which the SDOP is in a constant range (TH<0.15)" in this manner, the brightness image is multiplied by the brightness polarization superimposing coefficient $k_2$(=1).

In other words, the threshold value TH is set to an appropriate constant. Accordingly, "by using the polarization information, the object other than the detected object" can be removed from the output image.

In the brightness polarization superimposed image illustrated in FIG. 5A, the light in the brightness image and the reflected light by the road surface are favorably removed by computing using the SPOD.

As described above, if the computation (formula E) for the brightness image is performed "with the SDOP falling only within a predetermined range (TH<0.15)", it is possible to exclude the unnecessary detected object "before using the recognition algorithm for the computation".

Accordingly, it is possible to reduce the "false recognition of the object to be recognized".

Another specific example will be described.

Specific Example 3

Figure 6A:
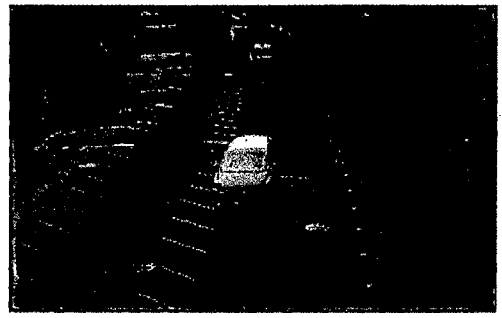
FIGS. 6A and 6B are diagrams illustrating still another example of the brightness image and the brightness polarization superimposed image of the same object to be imaged.
Figure 6B:

Specific example 3 presumes a case where, as computation parameters in the computing formulas (E) to (G), $k_1$=0, $k_2$=5, and TH=0.05 apply. FIGS. 6A and 6B illustrate the images of this case.

In other words, in this example, the threshold value TH is set to as low as 0.05. For the pixel with the SDOP that exceeds the threshold value TH, the brightness polarization superimposing coefficient $k_1$ to be multiplied by the brightness information is set to zero.

Further, for the pixel with the SDOP that does not exceed the threshold value TH, the brightness polarization superimposing coefficient $k_2$ to be multiplied by the brightness information is set to as large as 5.

FIG. 6A illustrates the brightness polarization superimposed image and FIG. 6B illustrates the brightness image.

The brightness image of FIG. 6B shows "many objects including the background other than the vehicle to be detected".

Regardless of whether the paint of the vehicle is white or black, "as the object to be detected, the vehicle is considered the same". However, in the brightness image, the image is largely different.

In other words, "the blackish vehicle" at the near side in the brightness image has low brightness and easily leads to the "difficulty in object recognition".

Thus, if the "brightness" of the brightness image is used as it is for detection as the characteristic quantity, it is difficult to improve the accuracy of the detection.

As is obvious from the brightness image of FIG. 6B, the image capturing condition is not the back light. Thus, the SDOP which is the polarization information is small regardless of the color of the paint of the vehicle.

With a pixel in which the SDOP becomes small, therefore, the information on the brightness image is emphasized with the brightness polarization superimposing coefficient $k_2(=5)$. Accordingly, the image can be expressed as the "image that has high brightness".

In the "brightness polarization superimposed image" illustrated in FIG. 6A, by brightness polarization superimposing using the SDOP, "many parts other than the vehicle" can be deleted.

Both the black vehicle and the white vehicle are "similarly shown in white". The brightness value itself at the brightness polarization superimposed image can be used as the "characteristic quantity for detection".

When used for the detection of the vehicle, the brightness polarization superimposing unit determines whether a value based on the brightness image is output or a fixed value is output so that light other than the reflected light from the vehicle is removed.

In the example described above, the brightness polarization superimposing unit can determine (formulas (F) and (G)) whether the value based on the brightness image is output or the fixed value is output, based on the value of each area of the image that includes the polarization information.

Further, based on the value of the degree of differential polarization (SDOP) of each area, the brightness polarization superimposing unit determines whether the value based on the brightness image is output or the fixed value is output.

However, without limitation to the above, the brightness polarization superimposing unit can determine whether the value based on the brightness image is output or the fixed value is output based on the degree of polarization (DOP) and the polarization ratio.

As in Specific example 3, the brightness polarization superimposing unit can determine whether "the value based on the brightness image is output so that the reflected light is removed" or the fixed value is output.

When used for the detection of the vehicle, the brightness polarization superimposing unit can determine whether the brightness based on the brightness image is output so that light other than the reflected light from the vehicle is removed or the fixed value is output.

In each embodiment described above, the image processing system may include "a saturation area determination unit that determines a saturation area in the brightness image".

In this case, the brightness polarization superimposing unit can change the superimposing method with respect to the saturation area and can set the superimposing quantity of the polarization information to zero with respect to the saturation area.

Alternatively, with respect to the saturation area, the brightness polarization superimposing unit can "output a constant to the corresponding area of the output image".

The image capturing unit 10 described with reference to FIG. 1 includes the polarization filter 132 divided into areas on the image capturing element 12.

Thus, based on each embodiment described, above, it is possible to carry out "an image processing method in which for the image that includes the polarization information, the polarization information is superimposed on the brightness image as the change in brightness of each pixel, and the superimposed image is output as the output image".

According to the above description, when the incident light to the image capturing element exceeds an image capturing range of the image capturing element (when the output value of the pixel is saturated), the polarization information is not superimposed on the brightness image.

However, in the brightness image obtained from the polarization image, not only the saturation area, but also an "area where saturation is not reached but close to being reached" is present.

If the polarization information is superimposed on the brightness image of the "area where saturation is close to being reached", it is considered impossible to obtain an appropriate brightness polarization superimposed image.

In order to handle such condition, the following measure is effective for the "area where saturation is not reached but close to being reached" above.

In other words, the "saturation degree" of the area is determined together with the area where saturation is close to being reached.

In the area where saturation is close to being reached, "based on the saturation degree, the ratio in superimposing between the brightness image and the polarization information is changed such that the closer to the saturation, the larger the ratio of the brightness image".

As described above, the brightness image $I_{bright}(x, y)$ is given by the next formula (C).

$$I_{bright}(x,y)=\{I_S(x,y)+I_P(x,y)\}/2 \tag{C}$$

In other words, the brightness image $I_{bright}(x, y)$ is specified by the brightness of the pixel specified by the position (x, y).

Then, for each pixel, it is determined whether $I_{bright}(x, y)$ is saturated or close to being saturated and further, the saturation degree is determined.

For the simplification of the description, the value when the brightness $I_{bright}(x, y)$ of the pixel at the position (x, y) is saturated is set to "1". It is presumed that $I_{bright}(x, y)$ changes between 0 and 1.

The area of "$I_{bright}(x, y) \geq 0.95$" is regarded as the "area where saturation is very close to being reached".

The area of "$I_{bright}(x, y) \geq 0.85$" is regarded as the "area where saturation is close to being reached".

The area of "$I_{bright}(x, y) < 0.85$" is regarded as the "area where saturation is not reached".

Figure 7:
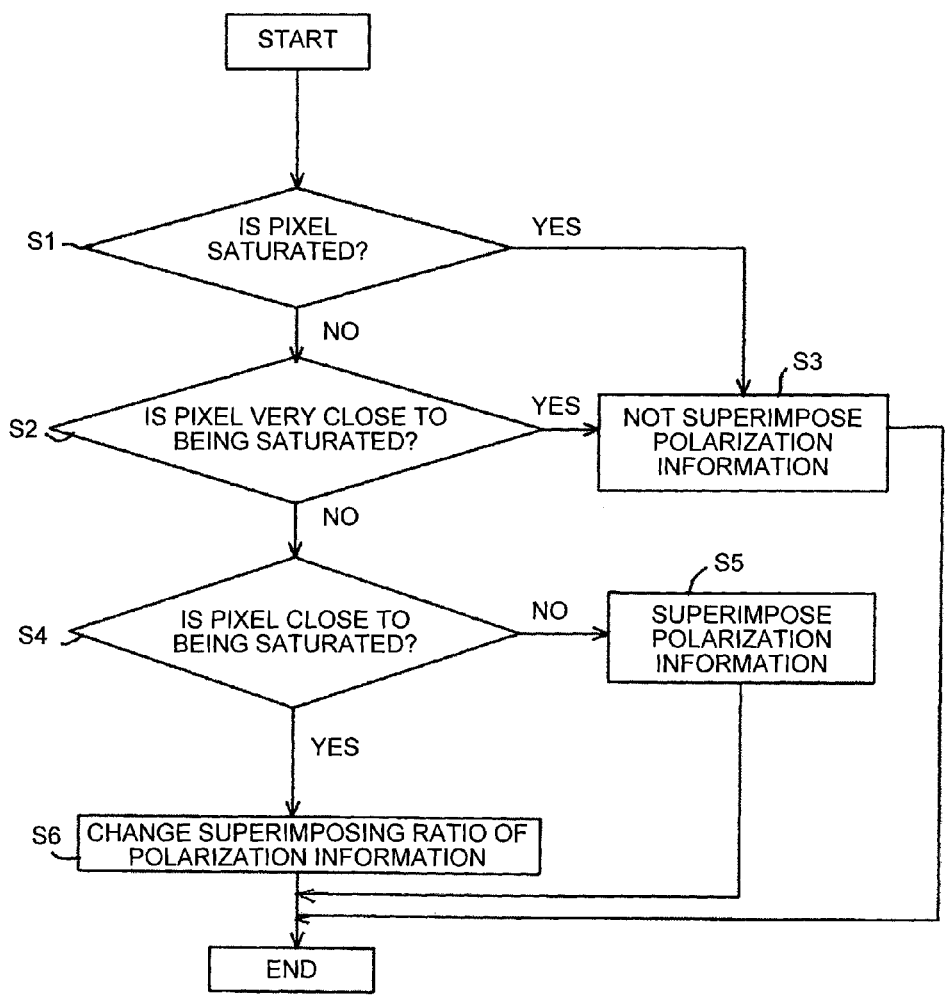
FIG. 7 is a flowchart for obtaining the degree of saturation of the brightness image.

With reference to FIG. 7, after START, it is first determined at step S1 whether "the pixel", that is, the pixel at the position (x, y) is saturated.

If "$I_{bright}(X, y)=1$" applies, the pixel is saturated.

If the pixel is saturated, the process proceeds to step S3, in which case "at that pixel, superimposition of the polarization information" is not performed.

If the pixel is not saturated, the process proceeds to step S2, where it is determined whether "the pixel" is the "area where saturation is very close to being reached".

If "$1 > I_{bright}(x, y) \geq 0.95$" applies, the pixel is the "area where saturation is very close to being reached". In this case also, the process proceeds to step S3, and in this area (pixel) also, "superimposition of the polarization information" is not performed.

If "$I_{bright}(x, y) < 0.95$" applies, the process proceeds to step 4, where it is determined whether the pixel is the "area where saturation is close to being reached".

If "$I_{bright}(x, y) < 0.85$" applies, it is determined that the pixel "is not the area where saturation is close to being reached". Then, the process proceeds to step S5, and "superimposition of the polarization information" is performed.

If "$0.95 > I_{bright}(x, y) \geq 0.85$" applies, the pixel is determined to be the "area where saturation is close to being reached".

In this case, the process proceeds to step S6, and changes the ratio of superimposition of the polarization information.

In other words, the superimposing ratio is changed such that the nearer the value of $I_{bright}(x, y)$ to the upper limit 0.95, the larger the ratio of the brightness image.

One example of changing the "superimposing ratio" by the computing formula will be described.

First, if it is determined that the pixel is not the "area where saturation is close to being reached", as described above, superimposition of the polarization information is performed.

In other words, the output Output(x, y) as the brightness polarization image at the pixel in this case is "$I_{bright\_por}(x, y)$" which is given at the right side of Mathematical formula 1.

If the pixel is the "saturation area" or the "area where saturation is very close to being reached", as described above, "superimposition of the polarization information" is not performed.

Thus, the output Output(x, y) at the corresponding pixel in this case is "$I_{bright\_por}(x, y)$".

When the pixel is the "area where saturation is close to being reached", the superimposing ratio is changed such that the nearer the value of $I_{bright}(x, y)$ to the upper limit 0.95, the larger the ratio of the brightness image.

In order to perform the above, for example, the following function ratio(x, y) is defined.

$$\text{Ratio}(x,y) = \{I_{bright}(x,y) - a\}/b$$

The output Output(x, y) is determined by being computed as below.

$$\text{Output}(x,y) = \text{ratio}(x,y) \bullet I_{bright}(x,y) + \{1 - \text{radio}(x,y)\} \bullet I_{bright\_por}(x,y)$$

The above a and b are "constants that define the saturation by the brightness of the pixel".

The larger the values of "a and b", the smaller the saturation. Reversely, the smaller the values of "a and b", the larger the saturation.

"a and b" are set according to $I_{bright}(x, y)$ in the range of "$0.95 > I_{bright}(x, y) \geq 0.85$" and as described above, the "superimposing ratio" is changed.

As described above, for each pixel, the saturation area determination unit can determine the "saturation degree (whether the pixel is saturated, very close to being saturated, or close to being saturated)".

The brightness polarization superimposing unit 20 in FIG. 1 has the above function.

The description has been given above for a case where the polarization information superimposing coefficient k in Mathematical formula 1 is changed according to the environment, for example, the coefficient is switched between when the light is the direct light and when the light is the back light.

However, it is sometimes preferable to "change the polarization information superimposing coefficient k according to types of a subject", instead of the environment.

For example, it is important for a vehicle-mounted camera and the like to detect the road surface and the signal.

For the "object including the white line which has the polarization dependence property" such as the road surface, it is preferable to increase the polarization information superimposing coefficient k even though the noise is somewhat increased.

Reversely, with respect to the object which does not have the polarization dependence property such as the signal, it is preferable to reduce the polarization information superimposing coefficient k because the noise is preferably reduced.

As one type of a measure for doing this, the polarization information superimposing coefficient k is changed according to the "position on the screen where each subject is typically present".

Considering the above-described examples of the road surface and the signal, in the image captured by the image capturing unit, the road surface is generally present at a "lower portion of the image".

Thus, for example, at the "lower portion of the image" where the road surface is present, the polarization information superimposing coefficient k is set to be large, and at an upper portion of the screen, the polarization information superimposing coefficient k is set to be small.

By arranging as above, at the necessary road surface area, the polarization information can be effectively used. At other areas where the polarization information makes no sense, the polarization information is not used but the brightness image can be used as it is.

By arranging as above, it is possible to obtain the "image with less noise".

In this example, the polarization information superimposing coefficient k is changed between the upper portion and the lower portion of the captured image. However, of course, the area of changing the polarization information superimposing coefficient k is not limited to the above.

By "continuously changing the polarization information superimposing coefficient k" on the image, it is possible to avoid the influence of the discontinuity at the boundary of the change.

Figure 8:
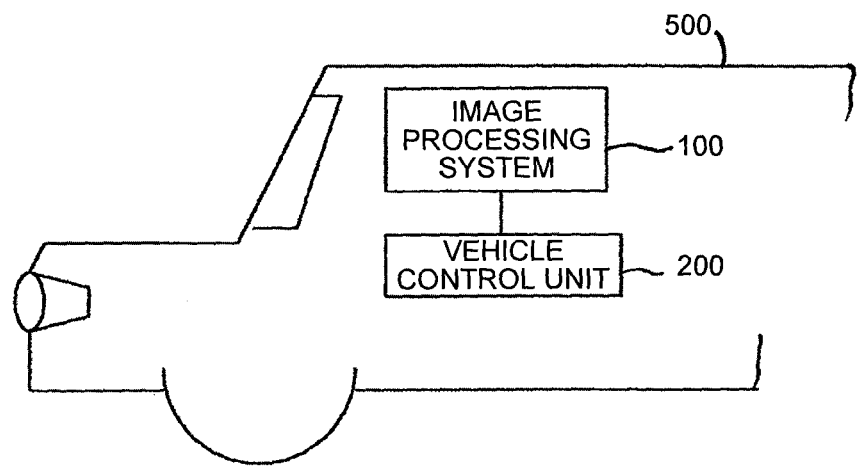
FIG. 8 is a diagram illustrating the image processing system used for controlling a vehicle.

FIG. 8 illustrates an embodiment in which an image processing system 100 is mounted on a vehicle 500 to perform vehicle control.

The image processing system 100 includes the above-described "image capturing unit, brightness polarization superimposing unit, and image processing/image recognizing unit" and performs the image recognition as described above.

The image capturing-unit of the image processing system 100 is provided at a fixed position of the vehicle 500 to capture an image of the road condition.

The brightness information captured by the image capturing unit is superimposed on the polarization information as described above. Based on the thus obtained result, the image processing/image recognizing unit performs a predetermined recognition operation.

The recognition result by the image processing/image recognizing unit is delivered to a vehicle control unit 200 serving as a device control unit.

Based on the input recognition result, the vehicle control unit 200 performs the vehicle control such as assistance of the brake and steering operations of the vehicle 500.

Note that the "image processing/image recognizing unit" may be integrally formed with the image processing system, or may be provided separately from the image processing system.

If the "image processing/image recognizing unit" is provided separately from the image processing system, the image processing/image recognizing unit receives a signal IMO from the image processing system to perform the necessary image processing/image recognition, and outputs the obtained result to the vehicle control unit 200.

FIG. 8 illustrates a case where an image capturing processing system is used for the vehicle control. However, the use of the image capturing processing system is not limited to the above, and is applicable to, for example, mobile objects other than the vehicle (e.g., a mobile robot, a ship, and an airplane), a robot for factory automation (FA), and an agricultural system.

Figure 9:
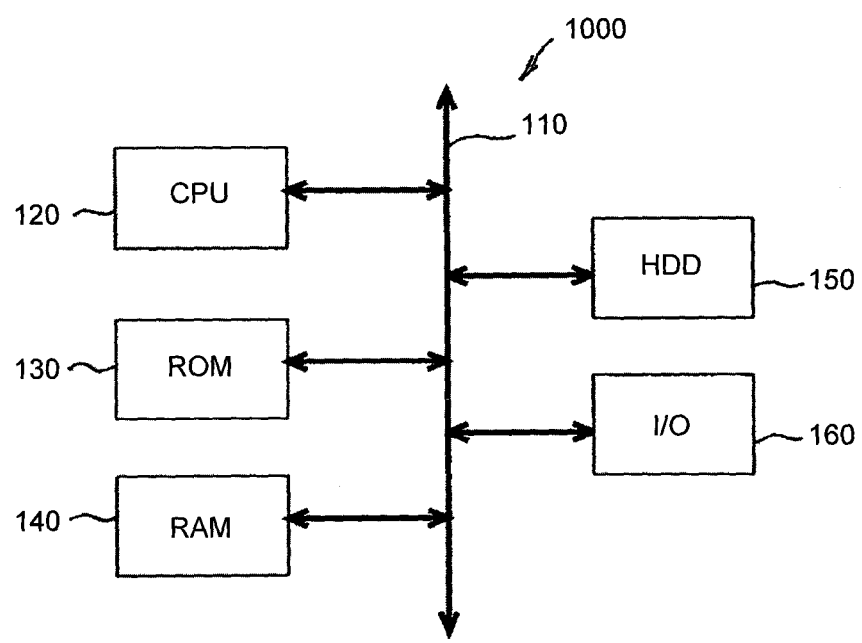
FIG. 9 is a diagram illustrating an example of hardware of the image processing system.

FIG. 9 is a block diagram illustrating one example of a computer system which is hardware for implementing the image processing system.

A computer system 1000 includes a bus 110, a CPU 120, a ROM 130, a RAM 140, a hard disk (HDD) 150, and an I/O 160.

Any of the CPU 120, the ROM 130, the RAM 140, the HDD 150, and the I/O 160 is connected to the bus 110 and information is transmitted/received through the bus 110.

The image capturing unit 10 illustrated in FIG. 1 is connected to the I/O 160.

The RAM 140 is used as a work area of the CPU 120.

The ROM 130 (including rewritable one) is used as a recording area of fixed information such as various control programs, tables, and parameters.

An "image processing program" implements functions of the above-described brightness polarization superimposing unit 20, image processing/image recognizing unit 30, and vehicle control unit 200. A recording medium such as a DVD-ROM is set to an optical drive device (not illustrated), and the image processing program is once stored in an HDD 250 and then loaded to the RAM 140 whenever necessary.

The image to be subjected to image processing is input to the I/O 160 from the image capturing unit 10.

As has been described, according to the present invention, the "image processing system" and the "image processing method" as described below can be provided.

[1-1]
An image processing system including:
a brightness polarization superimposing unit that superimposes polarization information of an image on a brightness image as a change in brightness of each pixel,
wherein image processing system has a function of outputting an image obtained by superimposition by the brightness polarization superimposing unit as an output image.

[1-2]
The image processing system according to 1-1, including an image capturing unit that captures the image that includes the polarization information and is to be subjected to superimposition processing by the brightness polarization superimposing unit.

[1-3]
The image processing system according to 1-1 or 1-2, wherein the brightness polarization superimposing unit performs superimposition as a linear sum of the polarization information and the brightness image.

[1-4]
The image processing system according to 1-1 or 1-2, wherein the brightness polarization superimposing unit performs superimposition as multiplication of the polarization information and the brightness image.

[1-5]
The image processing system according to any one of 1-1 to 1-4, wherein the polarization information superimposed on the brightness image by the brightness polarization superimposing unit is the degree of polarization or the degree of differential polarization.

[1-6]
The image processing system according to any one of 1-1 to 1-4, wherein the polarization information superimposed on the brightness image by the brightness polarization superimposing unit is a polarization ratio.

[1-7]
The image processing system according to any one of 1-1 to 1-6, including noise reduction unit that removes noise of the polarization information prior to superimposing on the brightness image.

[1-8]
The image processing system according to any one of 1-1 to 1-7, including:
the image capturing unit that captures the image that includes the polarization information and is to be subjected to superimposition processing by the brightness polarization superimposing unit; and
light source condition determination unit that estimates and determines a light source condition in capturing an image by the image capturing unit,
wherein the brightness polarization superimposing unit changes a method of superimposing the polarization information on the brightness image depending on an output of the light source information determination unit.

[1-9]
The image processing system according to any one of 1-1 to 1-8, including:
the image capturing unit that captures the image that includes the polarization information and is to be subjected to superimposition processing by the brightness polarization superimposing unit; and
daytime/nighttime determination unit that estimates and determines whether the time of capturing an image by the image capturing unit is daytime or nighttime,
wherein the brightness polarization superimposing unit changes the method of superimposing the polarization information on the brightness image depending on an output of the daytime/nighttime determination unit.

[1-10]
The image processing system according to any one of 1-1 to 1-10, including polarization information offset removal unit that removes offset by subtracting, from the polarization information, an average value of the polarization information in a predetermined range of the image that includes the polarization information,
wherein the polarization information, from which the offset has been removed by the polarization information offset removal unit, is superimposed on the brightness image.

[1-11]
The image processing system according to 1-10, wherein the polarization information offset removal unit divides, by the degree of polarization or the degree of differential polarization, the average value of the degree of polarization or the degree of differential polarization in the predetermined range on the image that includes the polarization information.

[1-12]
The image processing system according to 1-10 or 1-11, wherein the predetermined range in which the average value of the polarization information is obtained is an entire area of the image that includes the polarization information.

[1-13]
The image processing system according to 1-10 or 1-11, wherein the predetermined range in which the average value of the polarization information is obtained is an area obtained by removing a sky area from the entire area of the image that includes the polarization information.

[1-14]
The image processing system according to any one of 1-1 to 1-13, including direct light/back light determination unit that estimates and determines whether the image that includes the polarization information has been captured in direct light or back light based on information of the captured image.

[1-15]
The image processing system according to 1-14, wherein the direct light/back light determination unit determines whether image capturing has been performed in the direct light or the back light based on the degree of polarization or the degree of differential polarization of the captured image that includes the polarization information.

[1-16]
The image processing system according to 1-14, wherein the direct light/back light determination unit determines whether image capturing has been performed in the direct light or the back light based on an average value of the polarization ratio of an entire screen of the captured image that includes the polarization information.

[1-17]
The image processing system according to any one of 1-14 to 1-16, wherein when the direct light/back light determination unit determines that image capturing has been performed in the direct light, the superimposing quantity of the polarization information on the brightness image is set to zero.

[1-18]
The image processing system according to any one of 1-14 to 1-16, wherein when the direct light/back light determination unit determines that image capturing has been performed in the direct light, the superimposing quantity of the polarization information on the brightness image is changed.

[1-19]
The image processing system according to any one of 1-1 to 1-18, wherein the brightness polarization superimposing unit determines, based on a value of each area of the image that includes the polarization information, whether to output a value based on the brightness image or to output a fixed value.

[1-20]
The image processing system according to 1-19, wherein the brightness polarization superimposing unit determines, based on a value of the degree of polarization of each area, whether to output the value based on the brightness image or to output the fixed value.

[1-21]
The image processing system according to 1-19, wherein the brightness polarization superimposing unit determines, based on a value of the degree of differential polarization of each area, whether to output the value based on the brightness image or to output the fixed value.

[1-22]
The image processing system according to 1-19, wherein the brightness polarization superimposing unit determines, based on a value of the polarization ratio of each area, whether to output the value based on the brightness image or to output the fixed value.

[1-23]
The image processing system according to 1-19, wherein the brightness polarization superimposing unit determines whether to output the value based on the brightness image or to output the fixed value such that reflected light is removed.

[1-24]
The image processing system according to 1-19, used for detection of a vehicle, wherein the brightness polarization superimposing unit determines whether to output the value based on the brightness image or to output the fixed value, such that light other than the reflected light from the vehicle is removed.

[1-25]
The image processing system according to any one of 1-1 to 1-24, including saturation area determination unit that determines a saturation area in the brightness image,
wherein the brightness polarization superimposing unit changes the superimposing method with respect to the saturation area.

[1-26]
The image processing system according to 1-25, wherein with respect to the saturation area, the brightness polarization superimposing unit sets the superimposing quantity of the polarization information to zero.

[1-27]
The image processing system according to 1-25, wherein with respect to the saturation area, the brightness polarization superimposing unit outputs a constant to the corresponding area of the output image.

[1-28]
The image processing system according to any one of 1-25 to 1-27, wherein the saturation area determination unit has a function of determining, in addition to the saturation area in the brightness image, an area where saturation is close to being reached and the degree of saturation in the area where saturation is close to being reached, and
in the area where saturation is close to being reached, a superimposing ratio between the brightness image and the polarization information is changed according to the degree of saturation such that the closer to saturation, the larger the ratio of the brightness image.

[1-29]
The image processing system according to any one of 1-1 to 1-28, including the image capturing unit that captures the image that includes the polarization information and is to be subjected to superimposition processing by the brightness polarization superimposing unit,
wherein the brightness polarization superimposing unit changes the method of superimposing the polarization information on the brightness image according to a position of the image captured by the image capturing unit.

[1-30]
The image processing system according to any one of 1-1 to 1-29, including the image capturing unit that captures the image that includes the polarization information and is to be subjected to superimposition processing by the brightness polarization superimposing unit,
wherein the image capturing unit includes a polarization filter divided into areas on an image capturing element.

[1-31]
An image processing method to be performed by using the image processing system according to any one of 1-1 to 1-30, the method including:
superimposing, for an image that includes polarization information, the polarization information on a brightness image as a change in brightness of each pixel; and
outputting the superimposed image as an output image.

[2-1]
An image processing system including:
a brightness polarization superimposing unit that superimposes polarization information of an image on a brightness image as a change in brightness of each pixel,
wherein image processing system has a function of outputting an image obtained by superimposition by the brightness polarization superimposing unit as an output image, and
the brightness polarization superimposing unit includes an offset removing unit that removes offset by subtracting an offset quantity from the polarization information, the offset quantity being an average value of the polarization information in a predetermined range on the image that includes the polarization information.

[2-2]

The image processing system according to 2-1, wherein the offset removing unit subtracts the offset quantity from the polarization information, with the degree of polarization or the degree of differential polarization of the image that includes the polarization information being the polarization information and the average value of the polarization information in the predetermined range on the image being the offset quantity.

[2-3]

The image processing system according to 2-1, wherein the offset removing unit subtracts the offset quantity from the polarization information, with the polarization ratio of the image that includes the polarization information being the polarization information and the average value of the polarization information in the predetermined range on the image being the offset quantity.

[2-4]

The image processing system according to any one of 2-1 to 2-3, wherein the offset removing unit regards an entire area of the image that includes the polarization information as the predetermined range and regards the average value of the polarization information as the offset quantity.

[2-5]

The image processing system according to any one of 2-1 to 2-3, wherein the offset removing unit regards an area obtained by removing a sky area from the entire area of the image that includes the polarization information as the predetermined range and regards the average value of the polarization information as the offset quantity.

[2-6]

The image processing system according to any one of 2-1 to 2-6, including direct light/back light determination unit that determines whether an image capturing condition is direct light or back light using the polarization information of the image.

[2-7]

The image processing system according to 2-6, wherein the direct light/back light determination unit determines whether the image capturing condition is the direct light or the back light using the average value of the degree of polarization or the degree of differential polarization.

[2-8]

The image processing system according to 2-6, wherein the direct light/back light determination unit determines whether the image capturing condition is the direct light or the back light using the average value of the polarization ratio.

[2-9]

The image processing system according to any one of 2-6 to 2-8, wherein when the direct light/back light determination unit determines that the image capturing condition is the direct light, the superimposing quantity of the polarization information on the brightness image is changed.

[2-10]

The image processing system according to 2-9, wherein when the direct light/back light determination unit determines that the image capturing condition is the direct light, the superimposing quantity of the polarization information on the brightness image is set to zero.

[2-11]

The image processing system according to any one of 2-1 to 2-10, including an image capturing unit that captures the image that includes the polarization information and is to be subjected to superimposition processing by the brightness polarization superimposing unit, wherein the image capturing unit includes a polarization filter divided into areas on an image capturing element.

[2-12]

An image processing method to be performed by using the image processing system according to any one of 2-1 to 2-11, the method including:

superimposing, for an image that includes polarization information, the polarization information on a brightness image as a change in brightness of each pixel; and outputting the superimposed image as an output image.

Further, by using the image processing system and the image processing method, it is possible to implement a device control system and a device control method performing the above-described "vehicle control".

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image processing system comprising:
circuitry configured to:
capture an image that includes polarization information,
estimate and determine a light source condition in capturing the image,
change a method of superimposing the polarization information on a brightness image depending the estimated and determined light source condition,
superimpose the polarization information, on the brightness image as a change in brightness of each pixel, and
output an image obtained by superimposing as an output image.

2. The image processing system according to claim 1, wherein the circuitry is further configured to perform superimposition as a linear sum of the polarization information and the brightness image.

3. The image processing system according to claim 1, wherein the circuitry is further configured to perform superimposition as multiplication of the polarization information and the brightness image.

4. The image processing system according to claim 1, wherein the polarization information superimposed on the brightness image by the circuitry is a degree of polarization, a degree of differential polarization, or a polarization ratio.

5. The image processing system according to claim 1, wherein the circuitry is further configured to remove offset by subtracting, from the polarization information, an average value of the polarization information in a predetermined range of the image that includes the polarization information,
wherein the polarization information, from which the offset has been removed by the circuitry, is superimposed on the brightness image.

6. The image processing system according to claim 5, wherein the predetermined range in which the average value of the polarization information is obtained is an entire area of the image that includes the polarization information.

7. The image processing system according to claim 5, wherein the predetermined range in which the average value of the polarization information is obtained is an area obtained by removing a sky area from the entire area of the image that includes the polarization information.

8. The image processing system according to claim 1, wherein the circuitry is further configured to determine, based on a value of each area of the image that includes the polarization information, whether to output a value based on the brightness image or to output a fixed value.

9. The image processing system according to claim 1, wherein the circuitry is further configured to determine a saturation area in the brightness image,
wherein the circuitry is further configured to change a superimposing method with respect to the saturation area.

10. The image processing system according to claim 9, wherein with respect to the saturation area, the circuitry is further configured to set a superimposing quantity of the polarization information to zero.

11. The image processing system according to claim 9, wherein with respect to the saturation area, the circuitry is further configured to output a constant to a corresponding area of the output image.

12. The image processing system according to claim 9, wherein the circuitry is further configured to determine, in addition to the saturation area in the brightness image, an area where saturation is close to being reached and a degree of saturation in the area, and
in the area where saturation is close to being reached, a superimposing ratio between the brightness image and the polarization information is changed according to the degree of saturation such that the closer to saturation, the larger the ratio of the brightness image.

13. The image processing system according to claim 1, wherein the circuitry is further configured to include a polarization filter divided into areas on an image capturing element.

14. An image processing system comprising:
circuitry configured to:
estimate and determine whether an image that includes polarization information has been captured in direct light or back light based on information of the captured image,
superimpose the polarization information, on a brightness image as a change in brightness of each pixel, and
output an image obtained by superimposition as an output image.

15. The image processing system according to claim 14, wherein the circuitry is further configured to determine whether image capturing has been performed in the direct light or the back light based on a degree of polarization or a degree of differential polarization of the captured image that includes the polarization information.

16. The image processing system according to claim 14, wherein the circuitry is further configured to determine whether image capturing has been performed in the direct light or the back light based on an average value of a polarization ratio of an entire screen of the captured image that includes the polarization information.

17. The image processing system according to claim 14, wherein when the circuitry is further configured to determine that image capturing has been performed in the direct light, and a superimposing quantity of the polarization information on the brightness image is changed.

18. An image processing system comprising:
circuitry configured to:
capture an image that includes polarization information,
change a method of superimposing the polarization information on a brightness image according to a position in the image captured,
superimpose the polarization information, on the brightness image as a change in brightness of each pixel, and
output an image obtained by superimposition as an output image.

19. The image processing system according to claim 18, wherein the circuitry is further configured to include a polarization filter divided into areas on an image capturing element.

* * * * *